United States Patent
Chen et al.

(10) Patent No.: US 11,899,270 B2
(45) Date of Patent: Feb. 13, 2024

(54) VOICE COIL MOTOR DEVICE AND LENS MODULE HAVING VOICE COIL MOTOR DEVICE

(71) Applicant: TRIPLE WIN TECHNOLOGY(SHENZHEN) CO.LTD., Shenzhen (CN)

(72) Inventors: Shin-Wen Chen, New Taipei (TW); Sheng-Jie Ding, Guangdong (CN); Jing-Wei Li, Guangdong (CN); Jian-Chao Song, Guangdong (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 466 days.

(21) Appl. No.: 17/208,028

(22) Filed: Mar. 22, 2021

(65) Prior Publication Data
US 2022/0190701 A1    Jun. 16, 2022

(30) Foreign Application Priority Data
Dec. 11, 2020 (CN) .......................... 202011460059.0

(51) Int. Cl.
G02B 7/09 (2021.01)
H02K 41/035 (2006.01)

(52) U.S. Cl.
CPC ........... *G02B 7/09* (2013.01); *H02K 41/0354* (2013.01)

(58) Field of Classification Search
CPC ............ G02B 7/09; G05B 2219/41337; G05B 2219/41297; H02P 7/025; H02P 25/034
See application file for complete search history.

(56) References Cited

U.S. PATENT DOCUMENTS 10,432,077 B2    10/2019    Lee
2013/0050828 A1 *  2/2013    Sato .................... H04N 23/54
                                                    359/557

FOREIGN PATENT DOCUMENTS

CN            212163137 U   * 12/2020

* cited by examiner

*Primary Examiner* — Stephone B Allen
*Assistant Examiner* — Tamara Y. Washington
(74) *Attorney, Agent, or Firm* — ScienBiziP, P.C.

(57) ABSTRACT

A voice coil motor device includes a fixed component and a movable component. The movable component holds a lens. The movable component is accommodated in the fixed component. The fixed component includes a housing and a base. The housing defines a first hole and includes first side walls. The base defines a second hole. Centers of the first hole and the second hole are on an optical axis. The movable component is accommodated in the housing. The first hole receives the lens. One end of the movable component is received in the second hole of the base. The first side walls of the housing define a plurality of positioning holes, and the base includes a plurality of positioning posts. Each of the positioning posts is embedded in a corresponding one of the positioning holes.

16 Claims, 5 Drawing Sheets

VOICE COIL MOTOR DEVICE AND LENS MODULE HAVING VOICE COIL MOTOR DEVICE

FIELD

The subject matter herein generally relates to voice coil motors, and more particularly to a voice coil motor device and a lens module having the voice coil motor device.

BACKGROUND

A voice coil motor device is used to focus a lens of a lens module. Due to a large weight of component of the voice coil motor device, there is a risk of separation between components of the voice coil motor device.

BRIEF DESCRIPTION OF THE DRAWINGS

Implementations of the present disclosure will now be described, by way of embodiments, with reference to the attached figures.

DETAILED DESCRIPTION

Figure 1:
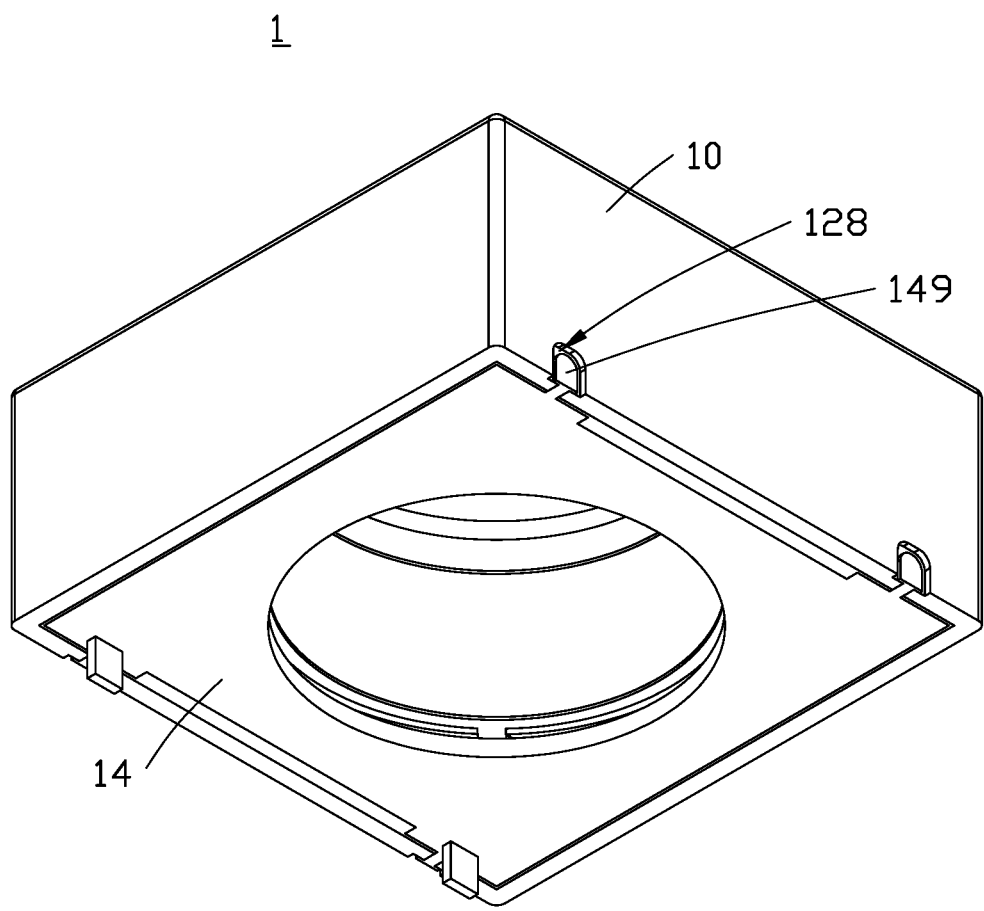
FIG. 1 is a perspective schematic diagram of a voice coil motor device according to an embodiment of the present disclosure.
Figure 2:
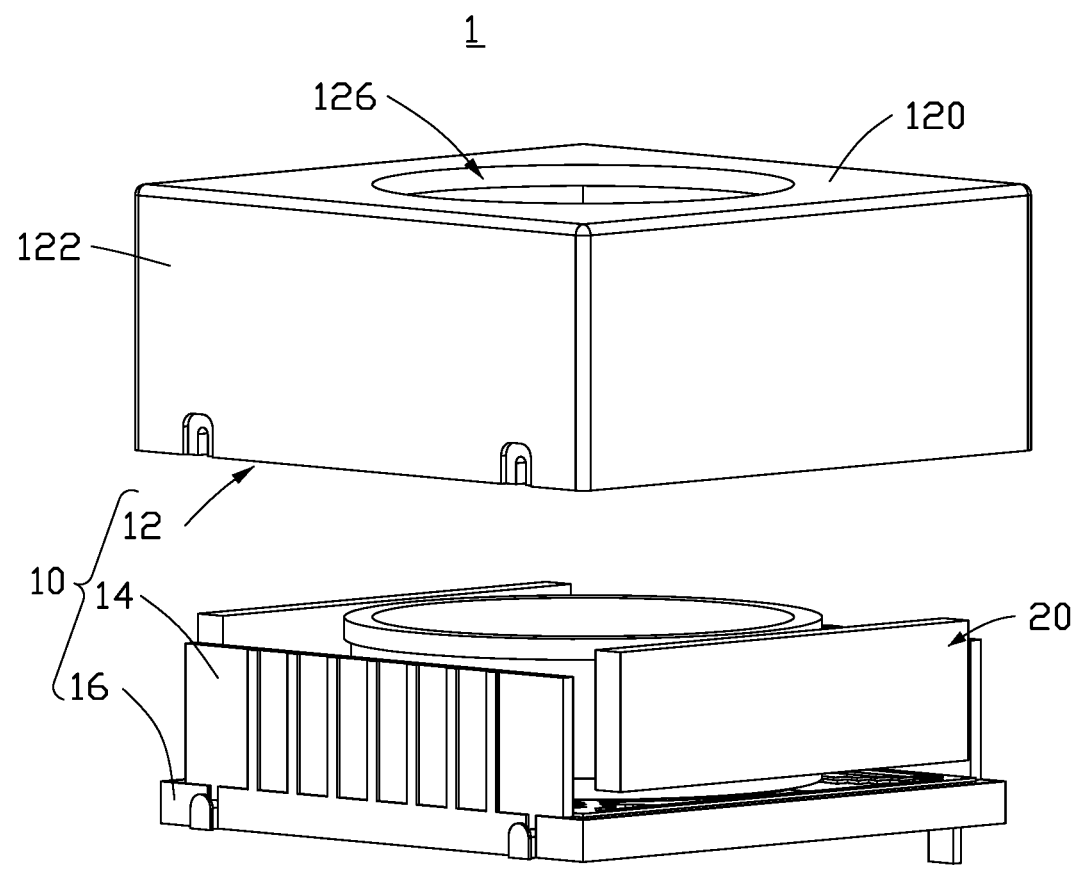
FIG. 2 is an exploded schematic view of the voice coil motor device shown in FIG. 1.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIGS. 1-4 show an embodiment of a voice coil motor device 1. The voice coil motor device 1 includes a fixed component 10 and a movable component 20. The movable component 20 is accommodated in the fixed component 10. The movable component 20 holds a lens of a lens module 100 (shown in FIG. 5) and generates a permanent magnetic field. The fixed component 10 is used to generate a variable magnetic field, and the magnetic fields between the movable component 20 and the fixed component 10 interact to drive the movable component 20 to move inside the fixed component 10 along an optical axis to achieve focusing of the lens.

The fixed component 10 includes a housing 12, a base 14, and a bracket 16. The housing 12 houses the movable component 20 and is sleeved on the base 14 and the bracket 16. The base 14, the bracket 16, and the housing 12 are matched to precisely fix the movable component 20 in the fixed component 10.

The housing 12 is substantially a square frame with a hollow interior and includes an upper surface 120, first side walls 122, and a first accommodating space (not shown in figures). The first side walls 122 extend around a periphery of the upper surface 120. The first accommodating space is cooperatively defined by the upper surface 120 and the first side walls 122 to accommodate the movable component 20. The upper surface 120 defines a first hole 126. The movable component 20 is received in the first accommodating space, and the lens held by the movable component 20 is clamped at the first hole 126. At least two positioning holes 128 are defined in each of two opposite first side walls 122. In one embodiment, each positioning hole 128 is a groove with an open end in a bottom edge 123 of the first side wall 122. Positions of the positioning holes 128 on the two opposite first side walls 122 correspond to each other. In one embodiment, the positioning holes 128 are hot riveting holes.

In other embodiments, there may be more than two positioning holes 128 defined in the opposite first side walls 122, the positioning holes 128 may be defined in each first side wall 122, or the positioning holes 128 may be other forms of holes.

Figure 4:
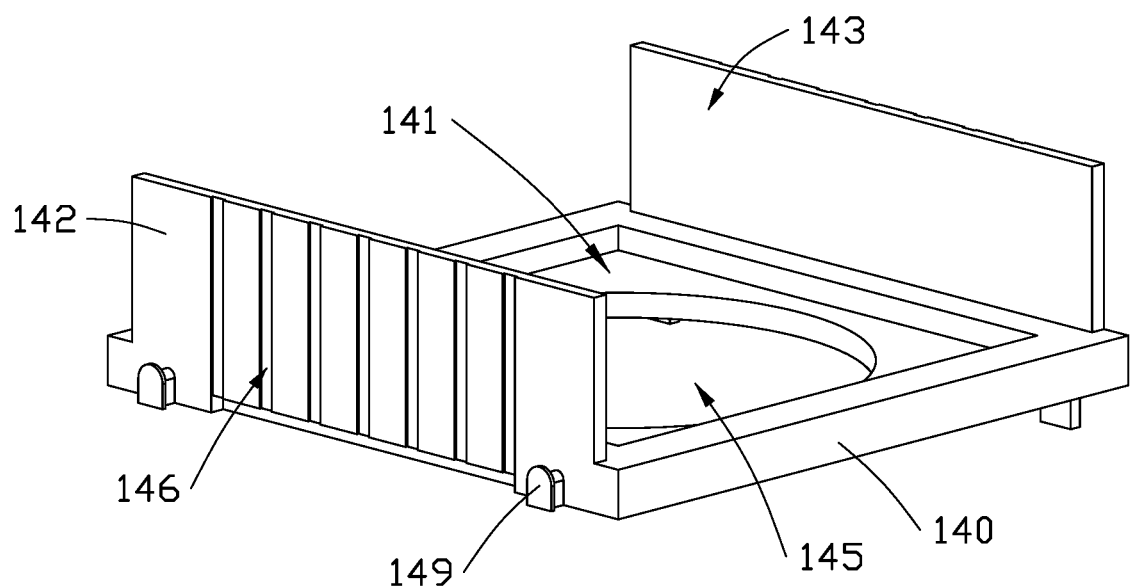
FIG. 4 is a perspective schematic view of a base of the voice coil motor device shown in FIG. 3.

Referring to FIG. 4, the base 14 includes a substantially square base plate 140 and two second side walls 142. The two second side walls 142 respectively extend substantially perpendicularly from opposite sides of the support base 140, and a second accommodating space 143 is cooperatively defined by the base plate 140 and the two second side walls 142 for accommodating the movable component 20. A surface of the base plate 140 in the second accommodating space 143 is recessed to define a receiving groove 141, and a second hole 145 is defined penetrating the base plate 140 in the receiving groove 141. A center of the second hole 145 is on the optical axis of the first hole 126 of the housing 12. In one embodiment, the first hole 126 and the second hole 145 have a same size and match a size of the lens to allow the lens to move. When the movable component 20 is received in the first accommodating space of the housing 12, one end of the movable component 20 is received in the receiving groove 141 of the base plate 140, and the movable component 20 is received in the second accommodating space 143.

The two second side walls 142 of the base plate 140 are each provided with two positioning posts 149. In one embodiment, the positioning posts 149 are hot riveting posts. The positioning posts 149 protrude from positions of the second side walls 142 adjacent to the base plate 140. The positioning posts 149 can be integrally formed with the base 14 or be additionally assembled on the base 14. The positioning posts 149 are inserted into the corresponding positioning holes 128 from the openings of the positioning holes 128. Each positioning hole 128 is such that after the positioning post 149 is inserted into the positioning hole 128, an outer surface of the positioning post 149 is on a same plane as the first side wall 122 of the housing 12 and will not protrude from a surface of the side wall 122. Then the movable component 20 is precisely fixed inside the fixed component 10.

The positioning posts 149 are provided corresponding in number to the riveting holes 128. In other embodiments, the positioning posts 149 can adopt other forms.

A plurality of grooves 146 is defined on an outer surface of the second side walls 142. The grooves 146 can be defined in a molding process of the base 14. The grooves 146 can enhance an adhesion strength between the housing 12 and the base 14 and reduce a risk of separation. The grooves 146 are arranged at intervals.

The bracket 16 is a substantially hollow square frame having four sides 160. The bracket 16 is designed to correspond to the base plate 140 of the base 14. A plurality of columns 162 extends from two opposite sides 160. The columns 162 correspond to the grooves 146 of the second side walls 144 and are received in the grooves 146. Glue is cured in the grooves 146 to bond and solidify the bracket 16 on the outside of the base plate 140, thereby increasing an adhesive strength between the housing 12 and the base 14 and reducing the risk of separation.

In one embodiment, the grooves 146 are a plurality and are spaced apart at intervals and extend along an extension direction of the second side walls 142. In other embodiments, a number and position of the grooves 146 can be set according to requirements. The columns 162 on the bracket 16 correspond in number and position to the grooves 146.

Figure 3:
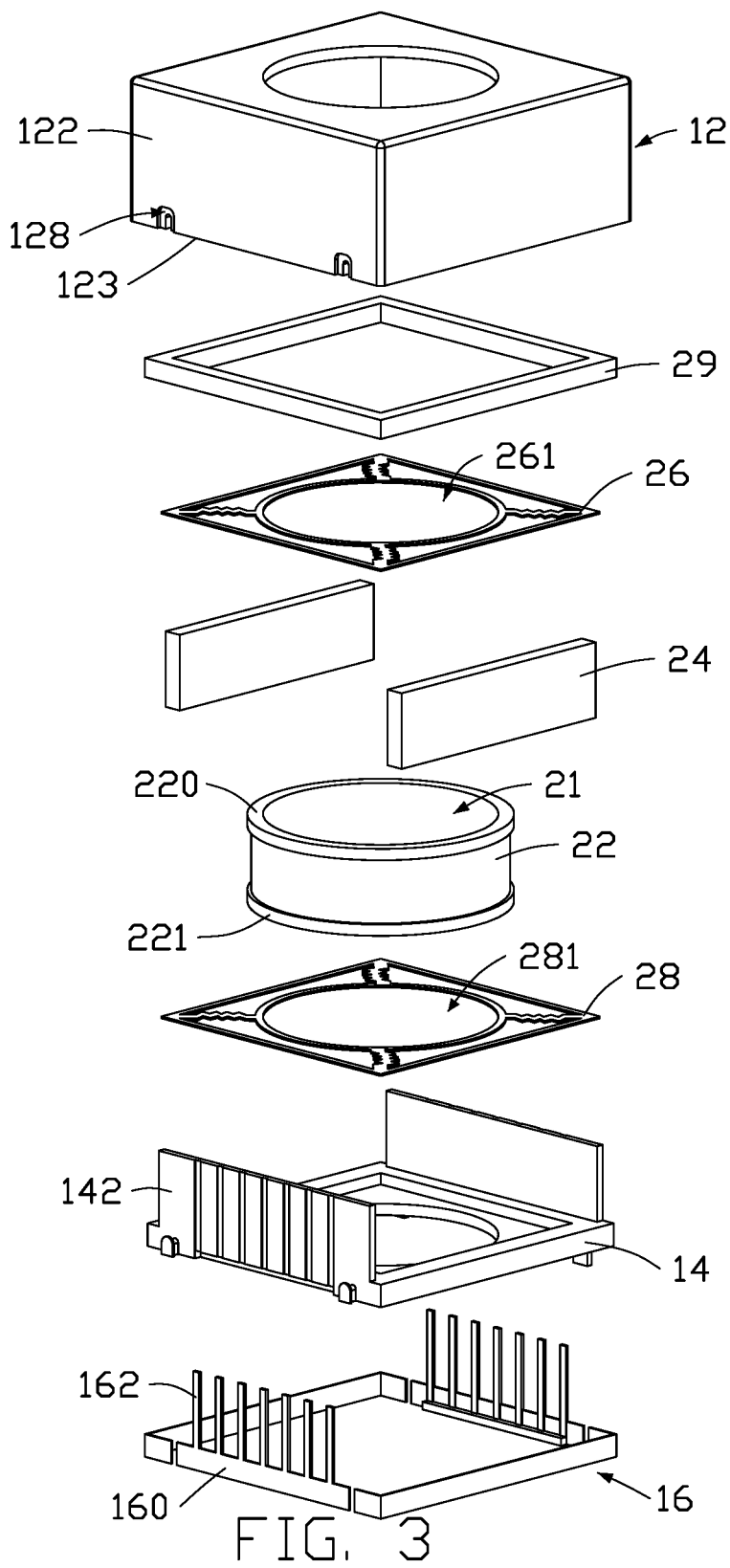
FIG. 3 is an exploded schematic view of the voice coil motor device shown in FIG. 2.

Referring to FIG. 3, the movable component 20 includes a coil carrier 22, two permanent magnets 24, an upper elastic piece 26, a lower elastic piece 28, and a support frame 29. The two permanent magnets 24 are fixedly mounted on an outer side of the coil carrier 22. The upper elastic piece 26 and the lower elastic piece 28 are respectively mounted and fixed on an upper surface 220 and a lower surface 221 of the coil carrier 22. The support frame 29 is mounted on the upper elastic piece 26. The support frame 29 is arranged between the fixed component 10 and the upper elastic piece 26 to couple the fixed component 10 and the movable component 20 together. The lower elastic piece 28 is received in the receiving groove 141 of the base 14 to mount the movable component 20 on the base 14, thereby coupling the movable component 20 to the fixed component 10.

The coil carrier 22 holds the lens and generates a variable magnetic field. The permanent magnet 24 generates a permanent magnetic field. An interaction force between the permanent magnetic field and the variable magnetic field drives the movable component 20 to move along the optical axis. An elastic force of the upper elastic piece 26 and the lower elastic piece 28 and the interaction force between the permanent magnetic field and the variable magnetic field constitute a pair of balancing forces, which jointly control the movable component 20 to maintain a focus position.

In one embodiment, the components in the movable component 2 may have other arrangements.

The coil carrier 22 is substantially a hollow cylinder including a third accommodating space 21 that penetrates opposite surfaces of the coil carrier. The third accommodating space 21 is used for receiving the lens. The third accommodating space 21 corresponds in position to the first hole 126 and the second hole 145, and centers of the third accommodating space 21, the first hole 126, and the second hole 145 are on the optical axis.

The two permanent magnets 24 are substantially rectangular and respectively fixed on two sides of the coil carrier 22. The two permanent magnets 24 are respectively located on two sides of the base 14 and are adjacent to the two second side walls 142 of the base plate 140.

The upper elastic piece 26 and the lower elastic piece 28 are respectively square frames. A first through hole 261 is defined in a middle of the upper elastic piece 26, and a second through hole 281 is defined in the lower elastic piece 28. The first through hole 261 and the second through hole 281 have a same size as the first hole 126 and the second hole 145 and correspond in position to the first hole 126 and the second hole 145. The coil carrier 22 is energized by a coil to displace the coil carrier 22 along the optical axis, thereby achieving zooming and focusing of the lens. When the coil is not energized, the coil carrier 22 is restored to an initial position by the upper elastic piece 26 and the loser elastic piece 28.

The support frame 29 is substantially a square frame having four sides and located between the housing 12 and the upper elastic sheet 26 for fixing a corresponding end of the movable component 20 to the housing 12 of the fixing assembly 10. The lower elastic piece 28 is used for fixing a corresponding end of the movable component 20 to the base 14 of the fixed component 10.

In assembly, the bracket 16 is sleeved on the base 14, and the columns 160 are fixed in the grooves 146 by curing, thereby fixing the bracket 16 on the base 14. The permanent magnets 24 are respectively fixed on opposite sides of the coil carrier 22. The upper elastic piece 26 and the lower elastic piece 28 are respectively fixed on the upper surface 220 and the lower surface 221 of the coil carrier 22. The support frame 29 is mounted on the upper elastic piece 26, thereby completing assembly of the movable component 20. Then, the movable component 20 is mounted in the receiving groove 141 of the base 14, the lower elastic piece 28 is mounted in the receiving groove 141, and the permanent magnets 24 are arranged adjacent to the second side walls 142. The housing 12 is sleeved on the base 14, and the positioning posts 149 of the base 14 are embedded in the corresponding positioning holes 128 of the housing 12, thereby completing assembly of voice coil motor device 1.

Figure 5:
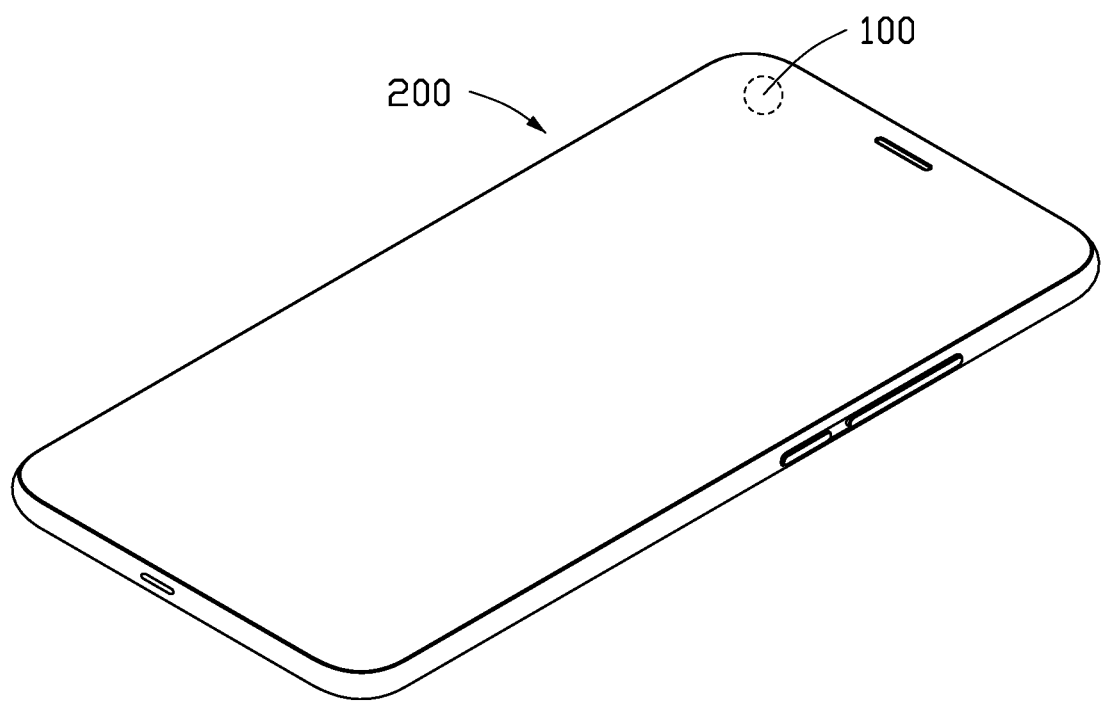
FIG. 5 is a perspective schematic diagram of an electronic device using the voice coil motor device.

Referring to FIG. 5, the voice coil motor device 1 can be applied to the lens module 100 of an electronic device 200. The electronic device 200 may be a mobile phone, a wearable device, a computer device, a vehicle, or a monitoring device.

In summary, the positioning posts 149 are embedded in the positioning holes 128, which makes the voice coil motor device 1 assembled with high precision and not easy to separate. Furthermore, the columns 162 fixed in the grooves 146 further increase the adhesion strength between the housing 12 and the base 14, thereby reducing the risk of separation.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A voice coil motor device comprising:
a fixed component; and
a movable component configured to hold a lens; wherein:
the movable component is accommodated in the fixed component;
the fixed component comprises a housing and a base;
the housing defines a first hole and comprises first side walls;
the base defines a second hole;
centers of the first hole and the second hole are on an optical axis;
the movable component is accommodated in the housing;
the first hole receives the lens;
one end of the movable component is received in the second hole of the base;
the movable component comprises a coil carrier, two permanent magnets, an upper elastic piece, and a lower elastic piece;
the coil carrier is configured to hold the lens;
the two permanent magnets are fixed on an outer side of the coil carrier;
the upper elastic piece and the lower elastic piece are respectively arranged on an upper surface and a lower surface of the coil carrier;
the lower elastic piece is mounted on a side of the base facing the upper elastic piece;
the first side walls of the housing define a plurality of positioning holes, and the base comprises a plurality of positioning posts; and
each of the positioning posts is embedded in a corresponding one of the positioning holes.

2. The voice coil motor device of claim 1, wherein:
the positioning posts are hot riveting posts, and the positioning holes are hot riveting holes.

3. The voice coil motor device of claim 2, wherein:
the positioning posts are embedded in the positioning holes; and
an outer surface of the positioning posts is on a same plane as a surface of the housing.

4. The voice coil motor device of claim 3, wherein:
the housing comprises an upper surface and first side walls;
each of the plurality of positioning holes is a groove having an opening at a bottom edge of the first side walls;
the base comprises a base plate and second side walls;
the second side walls extend from side edges of the base plate; and
the positioning posts are arranged on the second side walls.

5. The voice coil motor device of claim 4, wherein:
a plurality of grooves is defined on an outer surface of the second side walls; and
each of a plurality of columns of the fixed component is fixed in a corresponding one of the plurality of grooves.

6. The voice coil motor device of claim 5, wherein:
the plurality of grooves is arranged spaced apart and at intervals.

7. The voice coil motor device of claim 6, wherein:
the fixed component further comprises a bracket;
the bracket is fixed to a periphery of the base; and
the plurality of columns is coupled to two sides of the bracket.

8. The voice coil motor device of claim 2, wherein:
the movable component further comprises a support frame which is arranged between the upper elastic piece and the housing.

9. A lens module comprising a voice coil motor device comprising:
a fixed component; and
a movable component configured to hold a lens; wherein:
the movable component is accommodated in the fixed component;
the fixed component comprises a housing and a base;
the housing defines a first hole and comprises first side walls;
the base defines a second hole;
centers of the first hole and the second hole are on an optical axis;
the movable component is accommodated in the housing;
the first hole receives the lens;
one end of the movable component is received in the second hole of the base;
the movable component comprises a coil carrier, two permanent magnets, an upper elastic piece, and a lower elastic piece;
the coil carrier is configured to hold the lens;
the two permanent magnets are fixed on an outer side of the coil carrier;
the upper elastic piece and the lower elastic piece are respectively arranged on an upper surface and a lower surface of the coil carrier;
the lower elastic piece is mounted on a side of the base facing the upper elastic piece;
the first side walls of the housing define a plurality of positioning holes, and the base comprises a plurality of positioning posts; and
each of the positioning posts is embedded in a corresponding one of the positioning holes.

10. The lens module of claim 9, wherein:
the positioning posts are hot riveting posts, and the positioning holes are hot riveting holes.

11. The lens module of claim 10, wherein:
the positioning posts are embedded in the positioning holes; and
an outer surface of the positioning posts is on a same plane as a surface of the housing.

12. The lens module of claim 11, wherein:
the housing comprises an upper surface and first side walls;
each positioning hole is a groove having an opening at a bottom edge of the first side walls;
the base comprises a base plate and second side walls;
the second side walls extend from side edges of the base plate; and
the positioning posts are arranged on the second side walls.

13. The lens module of claim 12, wherein:
a plurality of grooves is defined on an outer surface of the second side walls; and
each of a plurality of columns of the fixed component is fixed in a corresponding one of the plurality of grooves.

14. The lens module of claim 13, wherein:
the plurality of grooves is arranged spaced apart at intervals.

15. The lens module of claim 14, wherein:
the fixed component further comprises a bracket;
the bracket is fixed to a periphery of the base; and
the plurality of columns is coupled to two sides of the bracket.

16. The lens module of claim 10, wherein:
the movable component further comprises a support frame which is arranged between the upper elastic piece and the housing.

\* \* \* \* \*